United States Patent [19]
Georgi

[11] 3,736,930
[45] June 5, 1973

[54] PARENTERAL ADMINISTRATION FLUID FLOW CONTROL SYSTEM

[75] Inventor: Heinz W. Georgi, La Jolla, Calif.

[73] Assignee: Ivac Corporation, San Diego, Calif.

[22] Filed: Apr. 14, 1970

[21] Appl. No.: 28,398

[52] U.S. Cl. ........... 128/214 E, 128/DIG. 13, 222/14, 222/39, 222/59, 222/76
[51] Int. Cl. .............................................. A61m 5/16
[58] Field of Search ...................... 128/214 E, 214 F, 128/DIG. 13, DIG. 12, 2.05 D, 2 A, 2 R; 222/14, 39, 40, 59, 76

[56] References Cited

UNITED STATES PATENTS

| | | | |
|---|---|---|---|
| 3,559,644 | 2/1971 | Stoft et al. | 128/214 F |
| 3,384,080 | 5/1968 | Muller | 128/214 F |
| 3,252,623 | 5/1966 | Corbin et al. | 128/214 E |
| 3,450,153 | 6/1969 | Hildebrandt et al. | 128/214 E |
| 2,925,814 | 2/1960 | Vibber et al. | 128/214 F |

*Primary Examiner*—William E. Kamm
*Attorney*—Fulwider, Patton, Rieber, Lee & Utecht

[57] ABSTRACT

Apparatus for parenteral administration of medical fluids, wherein a peristaltic infusion pump is automatically regulated by a digital control system to establish a fluid flow rate at any selected rate in a wide dynamic range, typically a 100 to 1 range. Measured and desired flow rates are converted to digital signals and compared, the electrical difference being used to vary a control voltage which establishes the frequency of pulses energizing a stepping motor drive for the pump. Aural and visual alarms respond to out-of-limit conditions detected by appropriate monitoring circuits in the control system.

25 Claims, 4 Drawing Figures

PARENTERAL ADMINISTRATION FLUID FLOW CONTROL SYSTEM

BACKGROUND OF THE INVENTION

This invention relates generally to improvements in fluid flow control systems and, more particularly, to a new and improved automatic, self-regulating, positive pressure infusion pump for parenteral administration of medical liquids over a wide range of fluid flow rates.

The usual medical procedure for the gradual parenteral administration of fluid into the human body, such as liquid nutrients, blood or plasma makes use of apparatus which is commonly referred to in the medical arts as an intravenous set. The intravenous set usually comprises a bottle of liquid, normally supported in an inverted position, an intravenous feeding tube, typically of plastic, and a suitable valve mechanism, such as a roll clamp, which allows the liquid to drip out of the bottle at a controlled rate into a drip chamber below the bottle. The drip chamber serves the dual function of allowing a nurse or other attendant to observe the rate at which the liquid drips out of the bottle and also creates a reservoir for the liquid at the lower end of the chamber to ensure that no air enters the main feeding tube leading to the patient.

While observation of the rate of drop flow via the drip chamber is a simple way of controlling the amount of liquid fed to a patient over a period of time, its ultimate effectiveness requires that a relatively constant vigil be maintained on the drop flow, lest it cease entirely due to exhaustion of the liquid supply or become a continuous stream and perhaps increase the rate of liquid introduction to the patient to a dangerous level.

By way of example, it has been the general practice in hospitals to have nurses periodically monitor drop flow rate at each intravenous feeding or parenteral infusion station. Such monitoring of drop flow rate is a tedious and time consuming process, prone to error and associated, possibly serious consequences, and resulting in a substantial reduction of the available time of qualified medical personnel for other important duties. Typically, the nurse monitoring drop flow rate will use a watch to time the number of drops flowing in an interval of one or more minutes, and she will then mentally perform the mathematics necessary to convert the timed drop count to an appropriate rate, e.g., in cubic centimeters per hour. If the calculated flow rate is substantially different than the prescribed rate, the nurse must manually adjust the roll clamp for a new rate, count drops again, and recalculate to measure the new rate.

Obviously, each of the aforedescribed measurements and calculations and flow rate adjustments usually takes several minutes time which, when multiplied by the number of stations being monitored and the number of times each station is monitored per day, can result in a substantial percentage of total personnel time available. In addition, under the pressure of a heavy schedule, the mental calculations performed by a harried nurse in calculating flow rate may not always prove to be reliable and, hence, errors do occur resulting in undesired, possibly dangerous infusion flow rates.

In addition to the aforedescribed difficulties, the parenteral administration of medical liquids by gravity induced hydrostatic pressure infusion of the liquid from a bottle or other container suspended above a patient is very susceptible to fluid flow rate variation due to changes in the liquid level in the bottle, changes in temperature, changes in the venous or arterial pressure of the patient, patient movement, and drift in the effective setting of the roll clamp or other valve mechanism pinching the feeding tube. Moreover, there are a number of situations, such as in intensive care, cardiac and pediatric patients, or where extremely potent drugs are being administered, where the desired flow rate must be accurately controlled and must be capable of precise selection over a relatively wide range of flow rates. In addition, it is extremely important in such situations for medical personnel to be informed of undesired fluctuations in flow rate, failure of the fluid delivery system, or exhaustion of liquid supply when the bottle is emptied.

It will be apparent, therefore, that some of the most critical problems confronting hospital personnel faced with an overwhelming duty schedule and limited man-hour availability are the problems of quickly, easily, reliably and accurately monitoring and regulating drop flow rate in the parenteral administration of medical liquids. In recent years, a number of electrical monitoring systems, drop flow controllers and infusion pumps have been developed to accomplish the various tasks of sensing and regulating drop flow rates. Some of these devices have also been capable of activating alarms when a potentially dangerous condition exists, thus freeing medical personnel to some extent for other duties. However, while such monitoring and drop rate control devices have generally served their purpose, they have not always proven entirely satisfactory from the standpoint of reliability, accuracy, and the often needed control over a wide range of selected flow rates, e.g., 100 to 1. In addition, such systems have sometimes been subject to substantial flow rate variations due to changes in temperature, tubing diameter changes or crimps, variations in venous or arterial pressure of the patient, or variations in the height of the bottle or solution level within the bottle.

Hence, those concerned with the development and use of parenteral fluid administration systems have long recognized the need for relatively simple, reliable, and accurate fluid flow control apparatus which obviates the aforedescribed difficulties. The present invention clearly fulfills this need.

SUMMARY OF THE INVENTION

Briefly, and in general terms, the present invention provides a new and improved fluid flow control system for parenteral administration of medical liquids, wherein a stepping motor drive for a peristaltic infusion pump is controlled by a closed loop digital system capable of sensing and regulating drop flow rate accurately over a wide dynamic range of flow rates.

In a presently preferred embodiment, by way of example, a peristaltic pump is driven by a stepping motor which is, in turn, energized by pulses from a variable pulse generator which produces pulses at a frequency determined by the amplitude of an input control voltage. The latter control voltage is produced by a novel rate memory which compares a pair of electrical signals proportional to the measured and desired flow rates, respectively, and integrates the electrical difference between these signals with the proper polarity to either increase or diminish the amplitude of the control voltage. In this way, precise regulation of the stepping motor energizing pulses to the proper frequency for establishing the desired flow rate is accomplished, the rate memory and motor performing the function of an electronic servo.

The control voltage input to the variable pulse generator for energizing the stepping motor, or the circuitry of the pulse generator itself, is modified by an appropriate nonlinear network to provide desired flow rate change sensitivity over a wide dynamic range of pump rates, so that low rate sensitivity is relatively suppressed while high rate sensitivity is enhanced in relation to the magnitude of flow rate change brought about by the pump for a specified incremental change in control voltage. By thus tailoring the pump rate vs. control voltage function, low flow rate regulation sensitivity is sufficiently damped to enable smooth regulation with digital precision while preventing undesirably large flow rate adjustment swings due to the digital input effect on the control voltage. At the same time, high regulation sensitivity is preserved at high flow rates where it is desired. Hence, the regulation sensitivity of the fluid flow control system of the present invention is such that the system provides stable and accurate flow rates over a very wide range, e.g., a range of 100 to 1.

The control voltage amplitude is monitored by appropriate voltage discriminators so that out-of-limit conditions calling for a demanded pump rate in excess of system delivery capability, or indicating a leakage flow rate which cannot be terminated by the pump, trigger appropriate aural and visual alarm systems and shut off the pump. In addition, in order to warn appropriate medical personnel of an exhausted liquid supply or any other condition in the administration set preventing fluid delivery, means are provided to monitor the rotations of the stepping motor and similarly alarm and bring about pump shut-off in the event no drops are sensed within a predetermined number of motor rotations. As a further protection against exhausted liquid supply and the possible pumping of air into a patient by the positive pressure system, the pulse output of the variable pulse generator is integrated, the integrator being reset each time a drop is detected. Hence, if no drop is detected for a prescribed number of stepping motor energizing pulses, the integrator voltage will build up to the point where it triggers alarming and pump shut-off.

The new and improved fluid flow control system of the present invention is extremely accurate, reliable and easy to use. The system provides digital precision in selecting and maintaining fluid flow rates throughout a wide dynamic range, and the system is quick to inform medical personnel of any conditions which might pose a hazard to the patient. Hence, the system of the present invention minimizes the time consuming and error prone aspects of human monitoring and flow rate adjustment and frees medical personnel for other duties.

The above and other objects and advantages of the invention will become apparent from the following more detailed description, when taken in conjunction with the accompanying drawings of illustrative embodiments.

DESCRIPTION OF THE PREFERRED EMBODIMENT

Figure 1:
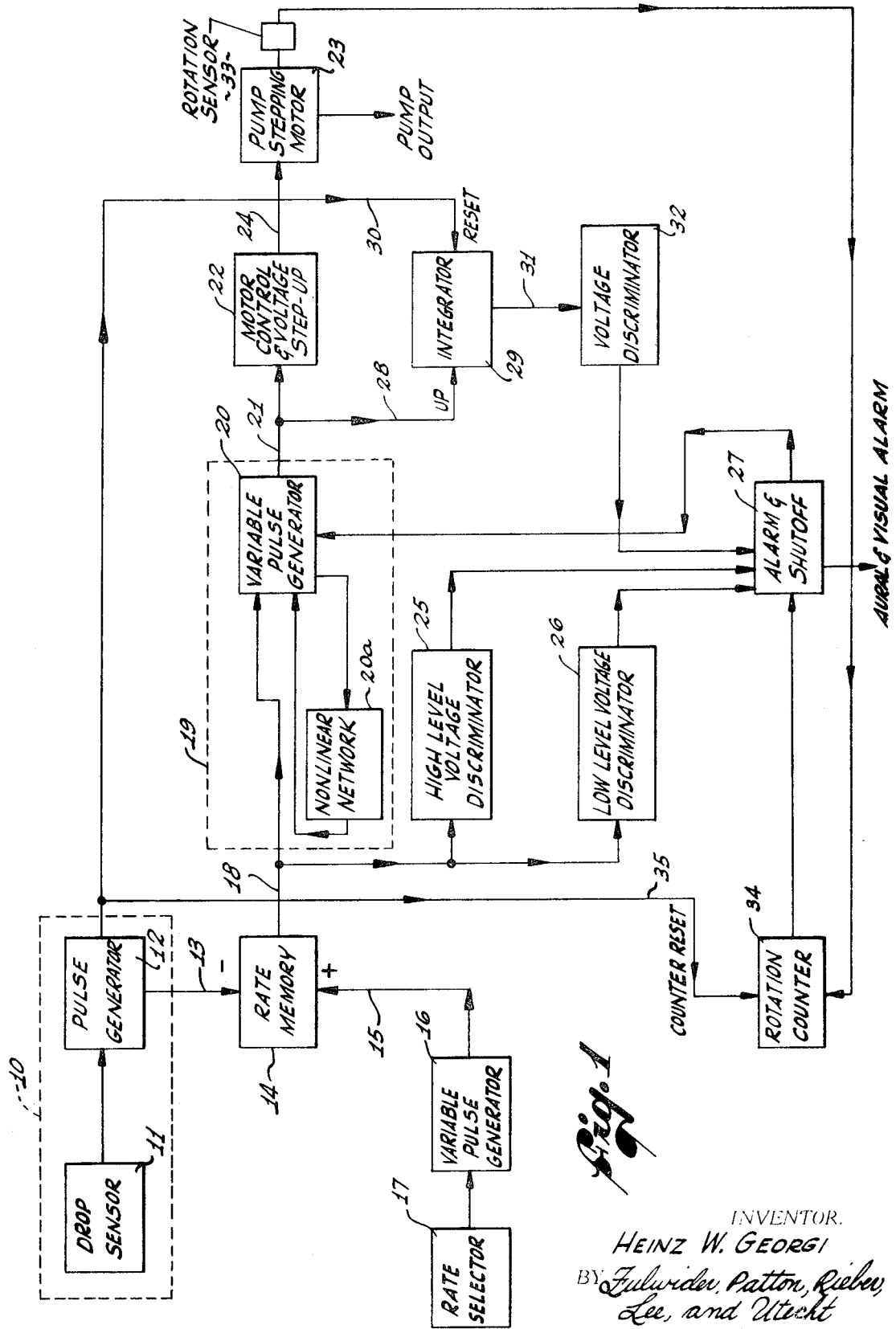
FIG. 1 is a block diagram of a fluid flow control system in accordance with the present invention.

Referring now particularly to FIG. 1 of the drawings, there is shown a fluid flow control system embodying the novel features of the present invention. In the ensuing description, while reference will be made to the term "IV" normally connoting intravenous administration, it is to be understood that this is by way of example only, and the flow control system of the present invention is suitable for other forms of parenteral administration as well as intravenous administration.

In order to control drop flow rate, it is obviously necessary to continuously monitor the actual drop flow as it occurs in an IV administration set. This is accomplished in the system of FIG. 1 by a drop flow monitor 10 which includes a drop sensor 11 and a pulse generator 12 adapted to register each drop as it falls and generate an electrical pulse train at a frequency directly proportional to the drop flow rate.

The drop sensor 11 monitors drop flow in a drip chamber (not shown) of the IV administration set and typically may include a sensor housing (not shown) containing a reference light source located a fixed distance from a photocell to define an optical sensing gap therebetween, with a reference light beam normally impinging upon the photocell. The housing is appropriately clamped upon the drip chamber of the IV set with the drip chamber positioned within the sensing gap to intercept the reference beam. A falling drop of fluid within the drip chamber interrupts the reference beam, and the variation in the electrical response of the photocell is communicated to appropriate circuitry indicating the presence of a drop. One example of a suitable drop sensor is set forth in copending U. S. Pat. application Ser. No. 685,928, inventor: Richard A. Cramer, filed Nov. 27, 1967, now U. S. Pat. No. 3,596,515. While a photocell monitoring device is ideally suited for the drop sensor 11, it will be appreciated that any drop sensing device capable of providing an electrical indication of the presence of a drop may be used without departing from the spirit and scope of the invention.

The pulse generator 12 is typically a conventional monostable device (one-shot) which provides an output pulse each time a drop is detected by the drop sensor 11, the pulse generator 12 providing output pulses of appropriate pulse width, e.g., 125 microseconds, for utilization by subsequent circuitry. The pulse generator 12 provides a negative going pulse train proportional to measured drop flow rate, as an electrical input over line 13 to a rate memory 14.

A second electrical input to the rate memory 14 is provided over line 15 in the form of a positive going pulse train from a variable pulse generator 16. The pulse generator 16 is typically a variable frequency square wave generator which generates a positive pulse train at a frequency determined by a conventional rate selector 17. The rate selector 17 alters the control voltage which establishes the frequency of the pulse generator 16 and is typically a thumbwheel switch (not shown) for setting a digital scale indicating desired drop flow rate.

The negative pulse train from the pulse generator 12, indicative of measured flow rate, and the positive pulse train from the pulse generator 16, indicative of desired flow rate, are combined and compared in the rate memory 14, the electrical difference between the signals indicating measured and desired rates being integrated in the rate memory with the proper polarity to either increase or diminish the amplitude of a d.c. output control voltage which is fed from the memory over line 18 as an electrical input to a voltage controlled oscillator 19.

Figure 2:
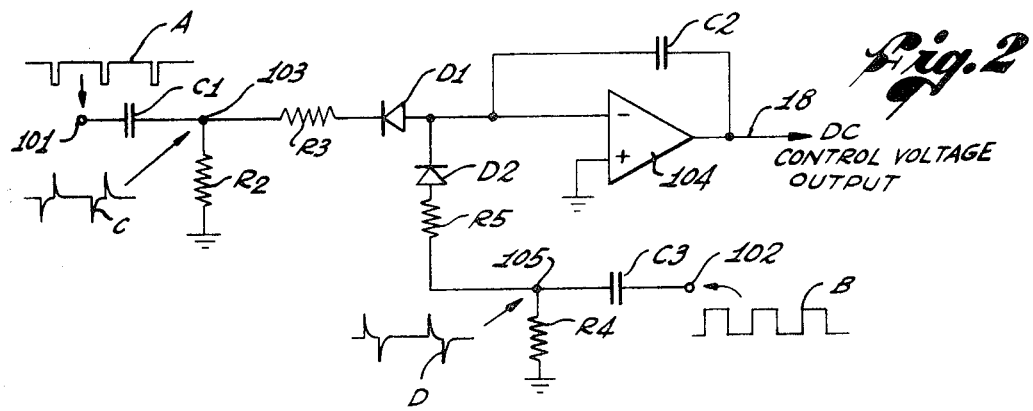
FIG. 2 is an electrical schematic and waveform diagram for a novel rate memory adapted for use in the flow control system of the present invention.

One embodiment of electrical circuitry suitable for carrying out the necessary functions of the rate memory 14 is illustrated in FIG. 2 of the drawings. Waveform A indicates the negative pulse train from the pulse generator 12 over line 13 (FIG. 1) to input terminal 101 (FIG. 2). Waveform B indicates the positive pulse train from the pulse generator 16 provided over line 15 (FIG. 1) to a second input terminal 102 (FIG. 2). The pulse train of waveform A is differentiated in a conventional manner by a capacitor C1 and resistor R2 to provide a differentiated waveform C at junction 103. The latter waveform is directed through resistor R3 and diode D1 oriented to clip the positive pulse spikes and direct the remaining negative spike waveform as input to the negative channel of a conventional operational amplifier 104, which, together with a capacitor C2, is electrically wired in a conventional integrating configuration to provide the d.c. control voltage output over line 18. In a similar manner, the waveform B is differentiated by capacitor C3 and resistor R4 to provide a differentiated waveform D at junction 105, the latter waveform being directed through a resistor R5 and diode D2 oriented to clip the negative pulse spikes from the waveform and provide the remaining positive spike waveform as an additional input to the same negative channel of the amplifier 104 as the negative spike pulse train passed by the diode D1.

If the measured and desired flow rates are the same, then the net electrical input to the amplifier 104 is zero, since the positive and negative spikes essentially cancel each other out, and the d.c. control voltage output over line 18 stays constant. If the desired rate is higher than the measured rate, the control voltage output drifts more negative while, on the other hand, the control voltage drifts more positive if the flow rate measured is higher than the desired flow rate. It will also be apparent that, in the event the electrical inputs to the amplifier 104 are disconnected, the d.c. control voltage output of the amplifier will hold constant at its last level prior to disconnection, thus avoiding pump output interruption.

The voltage controlled oscillator 19 includes a variable pulse generator 20 which receives the d.c. control voltage over line 18 as an electrical input to determine the frequency of the pulse generator output over line 21. As indicated in FIG. 1, the oscillator 19 includes a nonlinear network 20a in a feedback loop around the pulse generator 20 in order to shape the control voltage vs. pulse generator output function so that the flow rate regulation sensitivity of the overall control system enables stable regulation over a wide dynamic range of pump rates. In this regard, reference is made to FIG. 3 of the drawings wherein the solid curve represents the desired pump rate vs. control voltage function. It will be noted that the latter function is substantially exponential and that regulation sensitivity is relatively suppressed at low flow rates to enable smooth regulation with digital precision, while regulation sensitivity is substantially greater at high flow rates. Therefore, for any given incremental change in the control voltage, the flow rate change brought about by the pump will be less at low flow rates than the flow rate change for the same incremental change in control voltage at higher flow rates. This prevents undesirably large flow rate adjustment swings which might otherwise occur at low flow rates due to the nature of the digital inputs to the rate memory 14 and the transient stepping effect such inputs may have on the control voltage amplitude. By thus tailoring the pump rate vs. control voltage function, the regulation sensitivity of the fluid flow control system of the present invention provides stable and accurate flow rates over a very wide dynamic range of the order of magnitude of 100 to 1.

Figure 3:
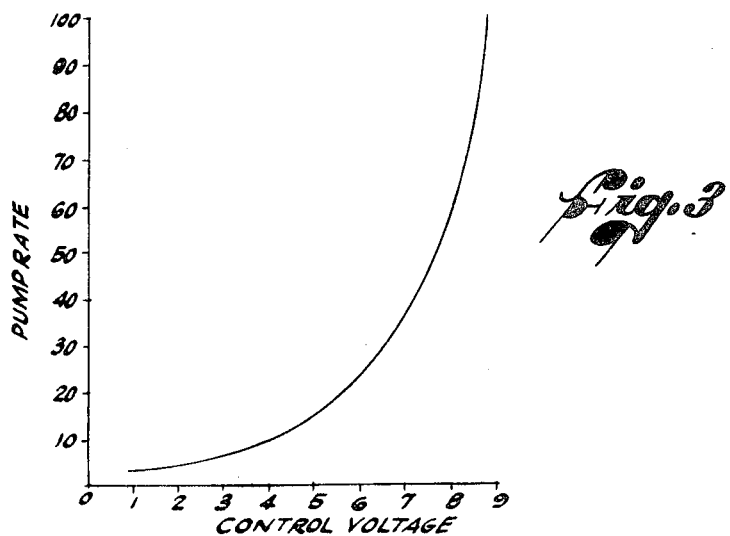
FIG. 3 is a graphical representation of a typical pump rate vs. control voltage function for a control system constructed in accordance with the invention.

While the nonlinear network 20a is shown in a feedback loop around the variable pulse generator 20, it will be apparent that other electrical circuit configurations may be utilized to provide an electrical output from the pulse generator over line 21 in accordance with the function shown in FIG. 3. For example, a function generator (not shown) may be included between the rate memory 14 and the input to the pulse generator 20 to alter the voltage input to the pulse generator in accordance with the function of FIG. 3, in lieu of the nonlinear network feedback arrangement shown in FIG. 1.

Figure 4:
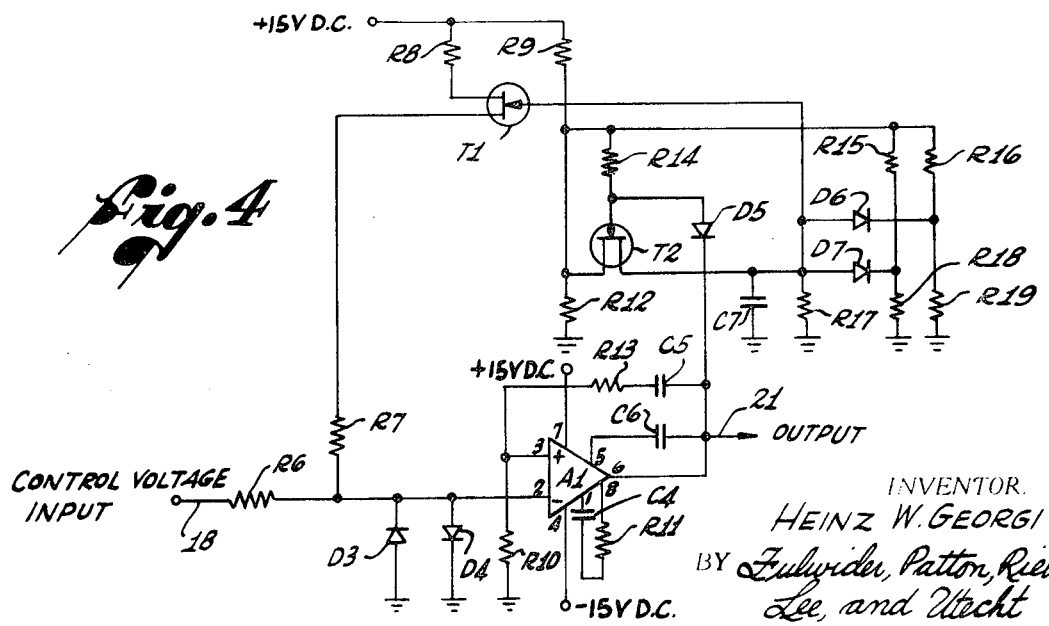
FIG. 4 is an electrical schematic diagram of one embodiment of a combined variable pulse generator and non-linear network for use in energizing the stepping motor drive employed by the control system of the present invention.

One embodiment of electrical circuitry suitable for carrying out the necessary functions of the voltage controlled oscillator 19, using a nonlinear feedback loop in the pulse generator circuit, is illustrated in FIG. 4 of the drawings, and typical component types and values are as follows:

| | |
|---|---|
| R6 | 33 kilohms |
| R7 | 22 kilohms |
| R8 | 470 ohms |
| R9, R10 | each 1 kilohm |
| R11 | 1.5 kilohms |
| R12 | 2.2 kilohms |
| R13 | 10 kilohms |
| R14 | 220 kilohms |
| R15 | 22 kilohms |
| R16, R17 | each 470 kilohms |
| R18 | 47 kilohms |
| R19 | 220 kilohms |
| C4 | 0.001 microfarads |
| C5 | 0.47 microfarads, 200 volts |
| C6 | 100 picofarads |
| C7 | 1 microfarad, 200 volts |
| D3 through D7 | Type 1N914 diodes manufactured by Texas Instruments, Inc. of Dallas, Texas |
| T1, T2 | each a Type SF8357 filed effect transistor manufactured by National Semiconductor Corp. of Santa Clara, California |
| A1 | Type LM709C operational amplifier manufactured by National Semiconductor Corp. of Santa Clara, California |

The output pulses over line 21 from the variable pulse generator 20 are directed to a motor control 22 which is an electronic switch and voltage stepup circuit used for turning a pump stepping motor 23 on and off at the rate determined by the voltage controlled oscillator 19. The motor control 22 may take any one of a variety of conventional forms such as a relay circuit included in the pulse generator 20, or an SCR (silicon controlled rectifier) gated d. c. voltage, or the like.

The stepping motor energizing pulses are directed by the motor control 22 over line 24 to the motor 23, the stepping motor itself being of conventional construction. The use of the stepping motor 23 as a drive for the infusion pump provides a stepped incremental mechanical output to a plurality of cam followers (not shown) or the like which massage an IV feeding tube and generate a peristaltic pumping action capable of developing a substantial positive pressure in the IV feeding tube, e.g., up to 760 millimeters of mercury.

The control voltage directed over line 18 from the rate memory 14 is monitored by a high level voltage discriminator 25 and by a low level voltage discriminator 26 for out-of-limit conditions. The high level voltage discriminator 25 responds to an over-speed or runaway condition indicated by an excessively high control voltage from the rate memory 14, indicating a demanded pump rate in excess of maximum system delivery capability. If such a condition is detected by the discriminator 25, an alarm and shutoff subsystem 27 is activated to trigger appropriate aural and visual alarms either at the pump location or at some convenient remote location, and to shutoff the pulse generator 20 and thereby deenergize the pump stepping motor 23.

Similarly, if the control voltage on line 18 drops to an out-of-limit low level, it is detected by the discriminator 26 which likewise activates the alarm and shutoff subsystem 27. Such a condition may occur where the IV tubing leaks and the system still sees a drop flow rate even with the stepping motor 23 stopped. Such a condition may also occur if the IV tubing is not sealed properly by the pump cam followers.

In order to provide an indication of an exhausted liquid supply or some other condition preventing drop flow, and to protect the patient against the possible pumping of air into the blood stream by the positive pumping of air into the blood stream by the positive pressure pumping system, the pulse output from the variable pulse generator 20 is also directed over line 28 to an integrator 29, typically a capacitor. Each stepping motor energizing pulse from the pulse generator 20 directed as input to the integrator 29 pumps up the voltage of the integrator capacitor, which is essentially equivalent to counting the stepping motor drive pulses. A reset signal, which discharges the integrator capacitor, is fed to the integrator 29 over line 30 from the pulse generator 12 of the drop flow monitor 10 each time a drop is sensed. Hence, if a substantial number of stepping motor energizing pulses, e.g., 25 pulses, appear on line 28 without any reset pulse appearing on line 30 in the same time interval, the integrator output voltage over line 31 will reach a level sufficient to be detected by a voltage discriminator 32 which then activates the alarm and shutoff subsystem 27. On the other hand, if drop flow does occur within a specified number of motor energizing pulses, then the integrator 29 will be reset and the voltage over line 31 will be insufficient to be detected by the discriminator 32.

As a further protection against exhausted liquid supply and the possible pumping of air, a rotation sensor 33 is coupled to the stepping motor 23 and drives a rotation counter 34 to keep track of the number of rotations of the stepping motor. A counter reset pulse is fed over line 35 to the counter 34 each time a drop is sensed by the drop flow monitor 10, in the same manner as reset pulses are directed over line 30 to the integrator 29. Hence, if no drops are sensed in a predetermined number of stepping motor rotations, e.g., 3 revolutions of the motor, the rotation counter 34 will activate the alarm and shutoff subsystem 27.

Hence, while the integrator 29 provides "no drop shutoff" monitoring of the electrical input to the stepping motor 23, the rotation counter 34 accomplishes a similar monitoring function at the mechanical output end of the stepping motor.

The fluid flow control system of the present invention provides a positive pressure infusion pump, for use with parenteral fluid administration systems, which is relatively simple and easy to use and provides digital precision in selecting and maintaining extremely accurate and reliable flow rates over a wide dynamic range, the flow control system being extremely safe and having watchdog capability to rapidly inform medical personnel of any conditions which may pose a hazard to the patient. The system of the present invention functions to maintain selected flow rates substantially independent of changes in temperature, tubing diameter changes or crimps, variations in venous or arterial pressure of the patient, or variations in the height of the IV bottle or solution level within the bottle.

It will be apparent from the foregoing that, while particular forms of the invention have been illustrated and described, various modifications can be made without departing from the spirit and scope of the invention. Accordingly, it is not intended that the invention be limited except as by the appended claims.

I claim:

1. In a system for parenteral administration of liquids via a feeding tube from a liquid source to a patient, apparatus comprising:
   infusion pump means;
   stepping motor means for incrementally driving said pump means, said motor means having an output member capable of rotational movement;
   rotation sensing means for monitoring rotational movements of said motor means;
   flow monitoring means for monitoring flow induced by said pump means; and
   means responsive to both said rotation sensing means and said flow monitoring means for indicating a lack of flow in a predetermined quantity of rotational movement.

2. Apparatus as set forth in claim 1, further including a rotation counter, and wherein:
   said rotation sensing means includes a rotation sensor coupled to said stepping motor means and driving said rotation counter; and
   said flow monitoring means includes a drop sensor and pulse generation means, said drop sensor activating said pulse generation means.

3. Apparatus as set forth in claim 1, wherein:
   said means responsive to both said rotation sensing means and said flow monitoring means includes means for de-energizing said stepping motor means upon indication of a lack of flow in a predetermined quantity of rotational movement.

4. Apparatus as set forth in claim 1, wherein:
   said means responsive to both said rotation sensing means and said flow monitoring means includes means for alarming upon indication of a lack of flow in a predetermined quantity of rotational movement.

5. In a system for parenteral administration of liquids via a feeding tube from a liquid source to a patient, apparatus comprising:
   motor means;
   electrical pulsing means for generating pulses to incrementally drive said motor means;
   pulse sensing means for monitoring said pulses driving said motor means;
   flow monitoring means for monitoring liquid flow in the administration system; and
   means responsive to both said pulse sensing means and said flow monitoring means for indicating a lack of flow within a time period determined by a specified number of said pulses driving said motor means.

6. Apparatus as set forth in claim 5, wherein:
   said means responsive to both said pulse sensing means and said flow monitoring means includes means for de-energizing said motor means upon indication of a lack of flow in a time period determined by a specified number of said pulses driving said motor means.

7. Apparatus as set forth in claim 5, wherein:
   said means responsive to both said pulse sensing means and said flow monitoring means includes means for alarming upon indication of a lack of flow in a time period determined by a specified number of said pulses driving said motor means.

8. Apparatus as set forth in claim 5, wherein:
   said flow monitoring means includes a drop sensing means for generating a pulse train at a frequency proportional to drop flow.

9. Apparatus as set forth in claim 8, wherein:
   said motor means is a stepping motor; and
   said means responsive to both said pulse sensing means and said flow monitoring means includes means for alarming and de-energizing said motor upon indication of a lack of drop flow in a time period determined by a specified number of said pulses driving said motor means.

10. In a system for parenteral administration of liquids via a feeding tube from a liquid source to a patient, apparatus comprising:
    positive pressure infusion pump means;
    electrical motor means for driving said pump means; and
    a closed loop control means including means for digitally regulating the frequency of electrical energization of said motor means in response to the difference between measured and desired output from said pump means.

11. Apparatus as set forth in claim 10, wherein:
    said motor means is an electrical stepping motor for incrementally driving said pump means.

12. In a system for parenteral administration of liquids via a feeding tube from a liquid source to a patient, apparatus comprising:
    positive pressure infusion pump means;
    electrical motor means for incrementally driving said pump means;
    rate setting means for generating an electrical signal at a frequency proportional to desired liquid flow rate;
    flow monitoring means for monitoring liquid flow induced by said pump means; and
    means responsive to both said rate setting means and said flow monitoring means for regulating the frequency at which said motor means drives said pump means.

13. In a system for parenteral administration of liquids via a feeding tube from a liquid source to a patient, apparatus comprising:
    electrical motor means;
    electrical pulsing means for generating pulses to incrementally drive said motor means;
    rate setting means for generating an electrical signal having a frequency proportional to desired liquid flow rate;
    flow monitoring means for monitoring liquid flow in the administration system and generating an electrical signal having a frequency proportional to measured liquid flow rate; and
    means responsive to both said rate setting means and said flow monitoring means for regulating the pulse frequency of said pulsing means.

14. Apparatus as set forth in claim 13, wherein:
    said means responsive to both said rate setting means and said flow monitoring means includes rate memory means for comparing said signals proportional to desired flow rate and measured flow rate, respectively, and for generating a control signal for establishing the frequency of said pulsing means.

15. Apparatus as set forth in claim 14, and further including:
    electrical discriminator means for monitoring said control signal to indicate out-of-limit conditions.

16. Apparatus as set forth in claim 14, wherein:
    said flow monitoring means includes a drop sensing means for generating a pulse train at a frequency proportional to drop flow.

17. In a system for parenteral administration of liquids via a feeding tube from a liquid source to a patient, apparatus comprising:
    electrical motor means;
    electrical pulsing means for generating pulses to incrementally drive said motor means;
    rate setting means for generating an electrical signal proportional to desired liquid flow rate;
    flow monitoring means for monitoring liquid flow in the administration system and generating an electrical signal proportional to measure liquid flow rate;
    control means responsive to both said rate setting means and said flow monitoring means for regulating the pulse frequency of said pulsing means, said control means including rate memory means for comparing and obtaining the difference between said signals proportional to desired flow rate and measured flow rate, respectively, and for generating a control signal for establishing the frequency of said pulsing means;
    said rate memory means including integration means to integrate the difference between said signals proportional to desired flow rate and measured flow rate, respectively, and vary said control signal in accordance with the integrated difference between said signals.

18. In a system for parenteral administration of liquids via a feeding tube from a liquid source to a patient, apparatus comprising:

electrical motor means;

electrical pulsing means for generating pulses to incrementally drive said motor means;

rate setting means for generating an electrical signal proportional to desired liquid flow rate;

flow monitoring means for monitoring liquid flow in the administration system and generating an electrical signal proportional to measured liquid flow rate;

control means responsive to both said rate setting means and said flow monitoring means for regulating the pulse frequency of said pulsing means, said control means including rate memory means for comparing said signals proportional to desired flow rate and measured flow rate, respectively, and for generating a control signal for establishing the frequency of said pulsing means; and nonlinear electrical circuit means for establishing a nonlinear relationship between the magnitude of said control signal and the frequency of said pulsing means.

19. Apparatus as set forth in claim 18, wherein:
said nonlinear means enables lower regulation sensitivity at low flow rates and higher regulation sensitivity at higher flow rates.

20. Apparatus as set forth in claim 19, wherein:
said nonlinear means establishes a substantially exponential relationship between said control signal and the frequency of said pulsing means.

21. In a system for parenteral administration of liquids via a feeding tube from a liquid source to a patient, apparatus comprising:

infusion pump means;

stepping motor means for incrementally driving said pump means;

electrical pulsing means for generating pulses to energize said stepping motor means;

rate setting means for generating a pulse train at a frequency proportional to desired drop flow rate;

flow monitoring means for generating a pulse train at a frequency proportional to measured drop flow rate;

means for comparing said pulse trains proportional to desired flow rate and measured flow rate, respectively, and for integrating the electrical difference resulting from such comparison to generate a control signal for establishing the frequency of said pulsing means; and nonlinear electrical circuit means for establishing a nonlinear relationship between said control signal and the frequency of said pulsing means, said nonlinear means enabling lower regulation sensitivity at low flow rates and higher regulation sensitivity at higher flow rates.

22. Apparatus as set forth in claim 21, and further including:

pulse sensing means for monitoring said pulses energizing said motor means; and means responsive to both said flow monitoring means and said pulse sensing means for indicating a lack of flow within a time period determined by a specified number of said pulses energizing said motor means.

23. Apparatus as set forth in claim 21, wherein said motor means has an output member capable of rotational movement, and further including:

rotation sensing means for monitoring rotational movements of said motor means; and means responsive to both said rotation sensing means and said flow monitoring means for indicating a lack of flow in a predetermined quantity of rotational movements.

24. Apparatus as set forth in claim 23, further including a rotation counter, and wherein:

said rotation sensing means includes a rotation sensor coupled to said stepping motor means and driving said rotation counter.

25. Apparatus as set forth in claim 21, and further including:

electrical discriminator means for monitoring said control signal to indicate out-of-limit conditions.

* * * * *